United States Patent
Lanzone et al.

(10) Patent No.: US 7,440,765 B2
(45) Date of Patent: Oct. 21, 2008

(54) TIMING SIGNAL GENERATION IN TELECOMMUNICATIONS NETWORKS

(75) Inventors: Sergio Lanzone, Genoa (IT); Orazio Toscano, Genoa (IT)

(73) Assignee: Ericsson AB, Stockholm (SE)

( * ) Notice: Subject to any disclaimer, the term of this patent is extended or adjusted under 35 U.S.C. 154(b) by 515 days.

(21) Appl. No.: 10/486,465

(22) PCT Filed: Aug. 9, 2002

(86) PCT No.: PCT/IB02/03619

§ 371 (c)(1),
(2), (4) Date: Jul. 26, 2004

(87) PCT Pub. No.: WO03/015339

PCT Pub. Date: Feb. 20, 2003

(65) Prior Publication Data

US 2004/0240477 A1    Dec. 2, 2004

(30) Foreign Application Priority Data

Aug. 10, 2001    (IT) .......................... MI2001A1782

(51) Int. Cl.
*H04B 7/00*    (2006.01)

(52) U.S. Cl. .................... 455/502; 713/400; 375/354; 370/503

(58) Field of Classification Search ................. 455/502; 713/400; 375/354, 362, 363; 370/503–519
See application file for complete search history.

(56) References Cited

U.S. PATENT DOCUMENTS 5,184,347 A * 2/1993 Farwell et al. .......... 455/502 X
5,732,076 A * 3/1998 Ketseoglou et al. ..... 455/502 X

FOREIGN PATENT DOCUMENTS

| EP | 0 522 748 A2 | 1/1993 |
| EP | 0 776 104 A2 | 5/1997 |
| EP | 0 813 319 A2 | 12/1997 |

* cited by examiner

*Primary Examiner*—Philip J Sobutka
(74) *Attorney, Agent, or Firm*—Kirschstein, et al.

(57) ABSTRACT

A method for generation of a clock synchronized with time reference signals derived from input signals in an apparatus of a telecommunications network comprising an input part receiving the input signals and a treatment part for treatment of the input signals. In the input part the method comprises the steps of deriving the time reference signals from the input signals, reading an edge of the reference signals, establishing the position of this edge relative to the internal data frame, inserting in the frame heading a pointer representing the established position of the edge relative to the frame and sending the frame to the treatment part. In the treatment part the method comprises the steps of receiving the frame, extracting the pointer, generating the time reference clock and synchronizing it with the position in the frame indicated by the pointer. An apparatus applying this method is also proposed.

15 Claims, 1 Drawing Sheet

TIMING SIGNAL GENERATION IN TELECOMMUNICATIONS NETWORKS

BACKGROUND OF THE INVENTION

The present invention relates to a method for the generation of timing signals in communication systems and networks and to an apparatus applying this method. The equipment inserted in a synchronous data transport network requires a function providing a timing source for correct operation. For example, the SETS function defined by ITU-T G.783 in the version of August 1997 represents the clock of the SDH network elements.

The timing function includes an internal oscillator function supplying the system clock for all the equipment. The internal oscillator receives a reference clock supplied by a function which generates the timing for the synchronous equipment, for example SETG in SDH systems). The timing is chosen from among a series of possible synchronization sources derived from three possible reference points. These possible reference points are derived from the synchronous input signals, for example, STM-N, from the plesiochronous input signals (for example PDH) or from an external synchronization input signal. In all three cases references are obtained which we shall call t1, t2 and t3 respectively.

The solution of deriving the timing from input signals appears optimal for various reasons. Unfortunately the elements of modern networks, for example digital cross connectors, can have synchronous or plesiochronous interface input signal cards located quite far away and even up to a hundred meters from the central nucleus of the equipment where the timing source function is realized.

There is thus the problem of transporting t1 or t2 from the interface card to the equipment nucleus while keeping the integrity of the signals.

The possible solution for correct transport of t1, t2 over dedicated cables for long distances requires particular treatment of the signals, for example, equalization. In addition, this solution increases the number of cables involved and today the number of cables interconnecting the central nucleus to the peripheral parts is a basic point. Being able to reduce this number makes the equipment simpler to install, more attractive in terms of space occupied and cost and makes possible heat dissipation problems less critical.

SUMMARY OF THE INVENTION

The general purpose of the present invention is to remedy the above mentioned shortcomings by making available a method of remote generation of a clock synchronized with reference signals derived from input signals. Another purpose is to make available an apparatus applying this method.

In view of this purpose it was sought to provide in accordance with the present invention a method for generation of a clock synchronized with time references derived from input signals in an apparatus of a telecommunications network, in which the telecommunications network comprises an input part receiving the input signals and a part for treatment of said input signals in which the input and treatment parts are interconnected by lines for the transport of the input signal in which the input signals comprise a frame structure; in which the method comprises the following steps in the input part: deriving the time reference signals from the input signals, reading an edge of the reference signals, creating an internal frame structure and synchronising the internal frame structure to a selected clock for transport of the input signal, establishing the position of the edge relative to the internal frame structure, inserting in the internal frame a pointer representing the established position of the edge relative to the frame, sending the frame to the treatment part; and in which the method comprises the following steps in the treatment part:

receiving the internal frame, extracting said pointer, and generating said clock synchronized with the position in the frame indicated by the pointer.

Again in accordance with the present invention it was sought to provide a telecommunications network apparatus comprising an input part for reception of input signals and a part for treatment of said input signals with the input and treatment parts being interconnected by transport lines for the input signals in which the input means comprises means for creating an internal frame structure synchronised to a selected clock for transport of the input signals; characterized in that the input part comprises means for deriving time reference signals from the input signal, means for reading an edge of the reference signals and establishing the position of said edge relative to the internal frame structure, and means for inserting in the internal frame transported to the treatment part a pointer representing the established position of the edge relative to the internal frame; and in which the treatment part comprises means for extracting said pointer from the received internal frame and means for generating a time reference clock synchronized with the position in the internal frame indicated by the pointer.

BRIEF DESCRIPTION OF THE DRAWING

To clarify the explanation of the innovative principles of the present invention and its advantages compared with the prior art there is described below with the aid of FIG. 1 a possible embodiment thereof by way of non-limiting example applying said principles.

DETAILED DESCRIPTION OF THE PREFERRED EMBODIMENT

Figure 1:
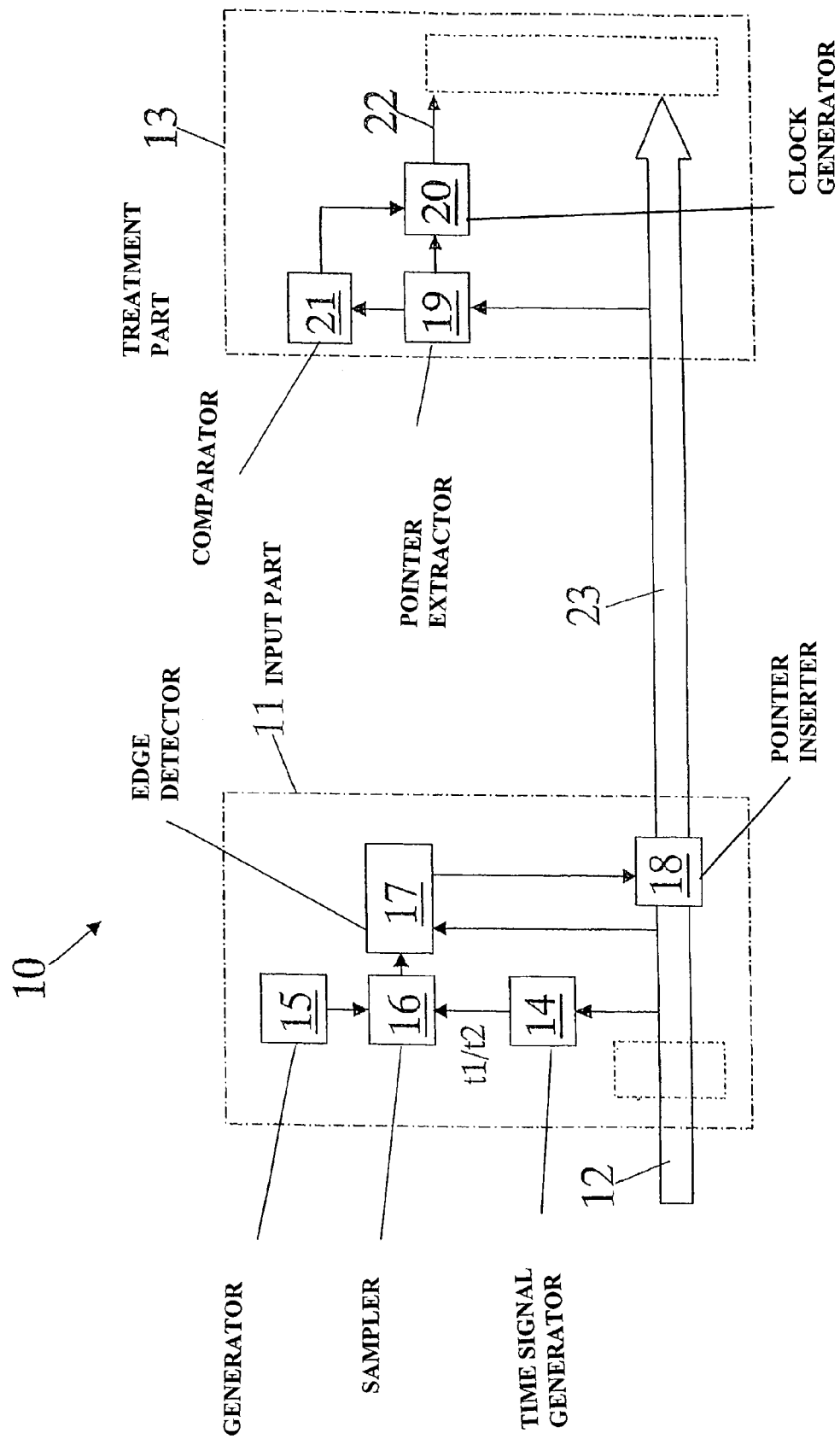

With reference to the figure an apparatus designated as a whole by reference number 10 of a telecommunications network is shown diagrammatically. This apparatus comprises an input part 11 receiving the input signals 12 and a part 13 for treatment of these input signals. The treatment part is the nucleus of the apparatus and can be very far from the input part. The input and treatment parts comprise the normal functions and devices of this type of equipment and they will therefore not be described in detail as they are readily imaginable to those skilled in the art.

As is known, the input part 11 and the treatment part 13 are interconnected by lines 23 for transport of the input signals with a frame structure.

The treatment part requires a clock synchronized with references derived from the input signals.

Basically, the idea is to use for synchronization the same cables 23 which transport the traffic data while encapsulating the synchronization data in the frames transmitted by the line cards in the input part to the equipment apparatus.

To achieve this purpose the idea is to use a pointer mechanism. Since the internal frame calls for a proprietary heading section for transport of particular data it is possible to dedicate a series of bytes for treatment of this mechanism.

In accordance with the method the time references are taken from the input signals and a edge of these references is read. Then the position of this edge is established in relation to the data frame structure and this position is identified by a particular pointer value entered in the dedicated bytes of the internal frame heading.

Advantageously additional data contained for example in an additional byte of the frame heading can be provided for transport of additional data concerning pointer generation. If there is a condition of failure of the reference signal t1 or t2 a particular value will be entered in this field to show that the pointer value is not valid. Upon return of the reference signal the validity of the new pointer generated will be shown by another specific value (new data flag). In all other cases a normal condition will be identified.

It is noted that the pointer can take on different values within different frames. In this manner it is not necessary that the clock derived from t1 or t2 be synchronized with that of the internal flow.

To ensure that the pointer value can be correctly interpreted at the point of destination in case of degradation along the transmission path, persistence of the pointer can be advantageously ensured by copying the pointer several times in the same internal frame heading. In this manner the destination pointer can provide better control.

On the receiving side, in the nucleus 13 of the equipment the pointers will be extracted and interpreted, the reference clock edge position in relation to the frame will be read and consequently the clock will be reconstructed from the associated function while synchronizing it for each frame with the position in the frame indicated by the corresponding pointer.

Advantageously in the receiving part 13 a control can be realized for identifying excessive pointer movements between two successive frames. In the treatment part the position indicated by the pointer is compared in two successive frames and the synchronism of the pointer of the second frame is not considered valid if the shifting in relation to the first frame pointer is greater than a predetermined amount.

To implement the method described above the equipment in accordance with the present invention comprises in the input part means 14 for deriving the time reference signals from the input signals.

The reference signals t1 or t2 derived from the input signals are over sampled by a sampler 16 by means of a high-frequency clock generated by a generator 15 so as to read a edge (for example, positive) of said reference signals by means of detection means 17. The detection means 17 establish the position of said edge relative to the internal data frame and pass it to insertion means 18 which insert in the heading of the frame sent to the treatment part 13 a pointer representing the established position of the edge relative to the frame.

The treatment part 13 in turn comprises means 19 for extracting the pointer from the frame received and means 20 which generate said time reference clock 22 and synchronize it with the frame position indicated by the pointer. There may also be comparison means 21 for comparing the subsequent pointers and inhibiting the clock generator from synchronizing with a pointer position excessively shifted in relation to the previous one.

The realization of the above mentioned individual means is readily imaginable to those skilled in the art on the basis of the description given here. They are therefore not further shown nor described.

It is now clear that the predetermined purposes have been achieved.

The invention provides a method for generation of a clock synchronized with time references derived from input signals in an apparatus of a telecommunications network comprising an input part receiving the input signals and a part for treatment of said input signals with the input and treatment parts being interconnected by input signal transport lines with a frame structure and the treatment part requiring said clock synchronized with said time references comprising in the input part the steps of deriving the time reference signals from the input signals, reading a edge of the reference signals, establishing the position of this edge relative to the internal data frame, inserting in the frame heading a pointer representing the established position of the edge relative to the frame, sending the frame to the treatment part and, in the treatment part, receiving the frame, extracting said pointer, and generating said time reference clock by synchronizing it with the position in the frame indicated by the pointer.

The invention also provides a telecommunications network apparatus comprising an input part for reception of input signals and a part for treatment of said input signals with the input and treatment parts being interconnected by transport lines for the input signals with a frame structure and the treatment part requiring a clock synchronized with time references derived from the input signals characterized in that the input part comprises means for deriving the time reference signals from the input signals, means of reading a edge of the reference signals and establishing the position of said edge relative to the internal data frame, and means of inserting in the frame heading sent to the treatment part a pointer representing the established position of the edge relative to the frame, and the treatment part comprises means of extracting said pointer from the frame received and means of generating said time reference clock while synchronizing it with the position in the frame indicated by the pointer.

Naturally the above description of an embodiment applying the innovative principles of the present invention is given by way of non-limiting example of said principles within the scope of the exclusive right claimed here. For example the exact structure and position of the pointers in the frame will depend on the specific implementation of the frames in the communication protocol.

The invention claimed is:

1. A method of generating a clock of an apparatus in a telecommunications network synchronized with time reference signals derived from input signals received from the telecommunications network, the apparatus comprising an input part for receiving the input signals, and a treatment part for treating the input signals, the input and treatment parts being interconnected by lines for transporting the input signals, the input signals having internal frame structures, the method comprising the steps of:

a) in the input part of the apparatus:
   i) deriving the time reference signals from the input signals;
   ii) reading an edge of the time reference signals;
   iii) creating an internal frame structure, and synchronizing the internal frame structure to a selected clock for transport of the input signals;
   iv) establishing a position of the edge relative to the internal frame structure;
   v) inserting in the internal frame structure a pointer representing the position of the edge relative to the internal frame structure; and
   vi) sending the internal frame structure to the treatment part; and b) in the treatment part of the apparatus:
   i) receiving the internal frame structure;
   ii) extracting the pointer; and
   iii) generating the clock synchronized with the position in the internal frame structure indicated by the pointer.

2. The method in accordance with claim 1, and the step of copying the pointer several times in the internal frame structure.

3. The method in accordance with claim 1, and the step of comparing the positions indicated by the pointer in two successive internal frame structures in the treatment part, and the step of considering the pointer of the second of the two internal frame structures invalid for synchronization if a shift in relation to the pointer of the first of the two internal frame structures greater than a predetermined amount is detected.

4. The method in accordance with claim 1, and the step of requiring the clock to be synchronized with the time reference signals in the treatment part.

5. The method in accordance with claim 1, and the step of comparing pointer values in successive internal frame structures in the treatment part, and considering the pointers invalid if a change above a preset amount is detected.

6. The method in accordance with claim 1, in which the internal frame structure comprises a heading, and in which the pointer is inserted into the heading.

7. The method in accordance with claim 1, and the step of oversampling the time reference signals in the input part by means of a clock generated by an internal clock generator.

8. The method in accordance with claim 1, and the step of entering additional pointer data in the internal frame structure in the input part.

9. The method in accordance with claim 8, in which the additional pointer data contain data indicating whether the pointer in the internal frame structure is to be considered valid or not.

10. A telecommunications network apparatus, comprising: an input part for receiving input signals from a telecommunications network; a treatment part for treating signals received from the input part; the input and treatment parts being interconnected by transport lines for the input signals, the input part comprising means for creating an internal frame structure synchronized to a selected clock for transport of the input signals;

a) the input part of the apparatus comprising:
  i) means for deriving time reference signals from the input signals;
  ii) means for reading an edge of the time reference signals and establishing a position of the edge relative to the internal frame structure; and
  iii) means for inserting in the internal frame structure transported to the treatment part a pointer representing an established position of the edge relative to the internal frame structure; and
b) the treatment part of the apparatus comprising:
  i) means for extracting the pointer from the received internal frame structure; and
  ii) means for generating a time reference clock synchronized with the position in the internal frame structure indicated by the pointer.

11. A synchronous data transport network comprising the apparatus of claim 10.

12. The apparatus in accordance with claim 10, in which the treatment part comprises means for comparing positions indicated by the pointer in two successive received internal frame structures and for commanding the clock generation means to not utilize the pointer of the second internal frame structure for generating a clock signal if, from the comparison of the pointers, a shift relative to the pointer of the first internal frame structure greater than a predetermined amount is detected.

13. The apparatus in accordance with claim 12, in which the means for reading the reference signal edge comprise an oversampler for oversampling the reference signals by means of a clock generated by an internal clock generator.

14. The apparatus in accordance with claim 13, in which the treatment part requires the clock to be synchronized with the time reference signals derived from the input signals.

15. The apparatus in accordance with claim 14, in which the internal frame structure comprises a heading, and in which the inserting means comprises means for inserting the pointer into the heading.

* * * * *